US008578159B2

(12) United States Patent
Emeott et al.

(10) Patent No.: US 8,578,159 B2
(45) Date of Patent: Nov. 5, 2013

(54) METHOD AND APPARATUS FOR ESTABLISHING SECURITY ASSOCIATION BETWEEN NODES OF AN AD HOC WIRELESS NETWORK

(75) Inventors: Stephen P. Emeott, Rolling Meadows, IL (US); Anthony J. Braskich, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 352 days.

(21) Appl. No.: 11/470,980

(22) Filed: Sep. 7, 2006

(65) Prior Publication Data
US 2008/0065884 A1 Mar. 13, 2008

(51) Int. Cl.
*H04L 29/06* (2006.01)

(52) U.S. Cl.
USPC ........... 713/168; 713/150; 713/155; 713/156; 713/157; 713/158; 713/159; 380/229; 705/67

(58) Field of Classification Search
USPC ................. 713/150, 155–159, 168; 380/229; 705/67
See application file for complete search history.

(56) References Cited

U.S. PATENT DOCUMENTS

| 5,572,528 | A | 11/1996 | Shuen |
| 6,707,796 | B1 * | 3/2004 | Li ................................. 370/254 |
| 6,775,258 | B1 | 8/2004 | Van Valkenburg et al. |
| 6,983,167 | B2 | 1/2006 | Adachi et al. |
| 6,996,714 | B1 | 2/2006 | Halasz et al. |
| 7,016,949 | B1 | 3/2006 | Tagawa |
| 7,039,068 | B1 | 5/2006 | Halasz |
| 7,095,736 | B1 | 8/2006 | Rasimas |
| 7,107,620 | B2 | 9/2006 | Haverinen et al. |
| 7,171,555 | B1 | 1/2007 | Salowey et al. |
| 7,194,763 | B2 | 3/2007 | Potter et al. |
| 7,197,643 | B2 * | 3/2007 | Takase ........................... 713/171 |

(Continued)

FOREIGN PATENT DOCUMENTS

| EP | 1271891 A1 | 1/2003 |
| EP | 1286506 A2 | 2/2003 |

(Continued)

OTHER PUBLICATIONS

PCT/US07/076594—PCT Preliminary Examination Report on Patentability—mailed Mar. 19, 2009—6 pages.

(Continued)

*Primary Examiner* — Edan Orgad
*Assistant Examiner* — Roderick Tolentino
(74) *Attorney, Agent, or Firm* — Randi L. Karpinia; Kenneth A. Haas

(57) ABSTRACT

A method and apparatus for establishing security associations between nodes of an ad hoc wireless network includes two authentication steps: an initial first contact step (authentication, authorization, and accounting (AAA)-based authentication), and a "light-weight" step that reuses key material generated during first contact. A mesh authenticator within the network provides two roles. The first role is to implement an 802.1X port access entity (PAE), derive transient keys used for encryption with a supplicant mesh point via a four-way handshake and take care of back end communications with a key distributor. The second role is as a key distributor that implements a AAA-client and derives keys used to authenticate a mesh point during first contact or fast security association. The key distributor and the on-line authentication server can communicate to one another without these messages being transported over mesh links.

3 Claims, 9 Drawing Sheets

(56) References Cited

U.S. PATENT DOCUMENTS

| | | | |
|---|---|---|---|
| 7,221,667 B2 | 5/2007 | Hori et al. | |
| 7,231,530 B1 | 6/2007 | Miller et al. | |
| 7,263,357 B2 | 8/2007 | Lee et al. | |
| 7,275,157 B2 | 9/2007 | Cam Winget | |
| 7,418,596 B1 | 8/2008 | Carroll et al. | |
| 7,448,068 B2 | 11/2008 | Sun et al. | |
| 7,502,331 B2 | 3/2009 | Dommety et al. | |
| 7,508,803 B2 | 3/2009 | Emeott et al. | |
| 7,529,933 B2 | 5/2009 | Palekar et al. | |
| 7,707,415 B2 | 4/2010 | Braskich et al. | |
| 2002/0012433 A1 | 1/2002 | Haverinen et al. | |
| 2002/0184055 A1 | 12/2002 | Naghavi et al. | |
| 2002/0184487 A1* | 12/2002 | Badamo et al. | 713/153 |
| 2003/0067892 A1 | 4/2003 | Beyer et al. | |
| 2003/0226017 A1 | 12/2003 | Palekar et al. | |
| 2003/0236982 A1 | 12/2003 | Hsu | |
| 2004/0025018 A1 | 2/2004 | Haas et al. | |
| 2004/0093522 A1 | 5/2004 | Bruestle et al. | |
| 2004/0103282 A1* | 5/2004 | Meier et al. | 713/171 |
| 2004/0105549 A1* | 6/2004 | Suzuki et al. | 380/278 |
| 2004/0240412 A1* | 12/2004 | Winget | 370/331 |
| 2004/0258092 A1 | 12/2004 | Sugaya | |
| 2005/0041662 A1 | 2/2005 | Kuo et al. | |
| 2005/0152305 A1* | 7/2005 | Ji et al. | 370/328 |
| 2005/0223111 A1 | 10/2005 | Bhandaru et al. | |
| 2005/0249244 A1 | 11/2005 | McNamara et al. | |
| 2006/0002351 A1* | 1/2006 | Madour | 370/338 |
| 2006/0062391 A1 | 3/2006 | Lee et al. | |
| 2006/0111045 A1 | 5/2006 | Orlassino et al. | |
| 2006/0198368 A1* | 9/2006 | Guichard et al. | 370/389 |
| 2006/0256722 A1 | 11/2006 | Taha et al. | |
| 2007/0110245 A1* | 5/2007 | Sood et al. | 380/270 |
| 2007/0153707 A1 | 7/2007 | Thubert et al. | |
| 2007/0162751 A1 | 7/2007 | Braskich et al. | |
| 2007/0189249 A1* | 8/2007 | Gurevich et al. | 370/338 |
| 2007/0192600 A1 | 8/2007 | Wong et al. | |
| 2007/0192605 A1 | 8/2007 | Mizikovsky et al. | |
| 2007/0195698 A1 | 8/2007 | Briscoe et al. | |
| 2007/0206537 A1* | 9/2007 | Cam-Winget et al. | 370/331 |
| 2007/0250713 A1 | 10/2007 | Rahman et al. | |
| 2007/0264965 A1 | 11/2007 | Taniguchi | |
| 2008/0063205 A1 | 3/2008 | Braskich et al. | |
| 2008/0065888 A1 | 3/2008 | Zheng et al. | |

FOREIGN PATENT DOCUMENTS

| | | |
|---|---|---|
| RU | 2190310 C2 | 9/2002 |
| RU | 2002131451 A | 3/2004 |
| RU | 2273964 C2 | 10/2006 |
| WO | 9819493 A2 | 5/1998 |
| WO | 0182038 A2 | 11/2001 |
| WO | 2005057507 A2 | 6/2005 |
| WO | 2006000239 A1 | 1/2006 |
| WO | 2006003532 A1 | 1/2006 |
| WO | 2006080623 A1 | 8/2006 |

OTHER PUBLICATIONS

U.S. Patent Office—U.S. Appl. No. 11/470,969—Office Action mailed Jun. 19, 2008—9 pages.
PCT/US07/75429—PCT Search Report and Written Opinion—mailed Sep. 9, 2008—11 pages.
IEEE P802.11r/D2.2, "Key Distribution for Fast BSS Transition," Part 11—Amendment 2: Fast BSS Transition—Section 8.5A—Jul. 2006—pp. 24-30.
U.S. Patent Office—U.S. Appl. No. 11/470,921—Office Action mailed May 15, 2008—10 pages.
PCT/US07/76592—PCT Search Report and Written Opinion—Mailed Jun. 4, 2008—9 pages.
U.S. Patent Office—U.S. Appl. No. 11/470,921—Office Action mailed Nov. 26, 2008—13 pages.
U S. Patent Office—U.S. Appl. No. 11/470,921—Office Action mailed Jun. 16, 2009—10 pages.
IEEE P802.11s/D1.0, "Action Frame Format Details," Part 11—Amendment ESS Mesh Networking—Section 7.4—Nov. 2006—pp. 53-64.
IEEE Standard for Information Technology—Telecommunications and information exchange between systems—Local and metropolitan area networks—Specific requirements—Part 11: Wireless LAN Medium Access Control (MAC) and Physical Layer (PHY) specifications Amendment 6;Medium Access Control (MAC) Security Enhancements. Jun. 24, 2004. IEEE, p. 1-190.
U.S Patent Office—U.S. Appl. No. 11/470,973—Office Action mailed Jun. 27, 2008—20 pages.
Aboba, B. et al. RFC: 3748 Extensible Authentication Protocol (EAP). Jun. 2004. IEEE, p. 1-63.
Funk, Paul et al. EAP Tunneled TLS Authentication Protocol (EAP-TTLS), Jul. 2004. p. 1-54.
PCT/US07/75439—PCT Search Report and Written Opinion—mailed Jul. 7, 2008—9 pages.
U.S Patent Office—U.S. Appl. No. 11/470,973—Office Action mailed May 12, 2009—13 pages.
IEEE 802.11r/D2.2, 8A.2.1—Part 11—Amendment 2: Fast BSS Transition—Fast BSS Transition Initial Mobility Domain Association in an RSN—Jul. 2006—pp. 39-42.
PCT/US07/076594—PCT Preliminary Examination Report on Patentability—mailed Mar. 9, 200—6 pages.
PCT/US07/76594—PCT Search Report and Written Opinion—mailed Apr. 8, 2008—7 pages.
Notice of Allowance mailed on Nov. 24, 2008 in U.S. Appl. No. 11/470,969, Stephen P. Emeott, filed Sep. 7, 2006.
Notice of Allowance mailed on Sep. 11, 2009 in U.S. Appl. No. 11/470,921, Stephen P. Emeott, filed Sep. 7, 2006.
Notice of Allowance mailed on Dec. 14, 2009 in U.S. Appl. No. 11/470,921, Stephen P. Emeott, filed Sep. 7, 2006.
Notice of Allowance mailed on Apr. 8, 2010 in U.S. Appl. No. 11/470,921, Stephen P. Emeott, filed Sep. 7, 2006.
International Preliminary Report on Patentability and Written Opinion for related International Patent Application No. PCT/US2007/075429 mailed on Mar. 19, 2009.
Final Office Action mailed on Nov. 26, 2008 in U.S. Appl. No. 11/470,973, Anthony J. Braskich, filed Sep. 7, 2006.
Notice of Allowance mailed on Oct. 20, 2009 in U.S. Appl. No. 11/470,973, Anthony J. Braskich, filed Sep. 7, 2006.
Notice of Allowance mailed on Nov. 4, 2009 in U.S. Appl. No. 11/470,973, Anthony J. Braskich, filed Sep. 7, 2006.
Notice of Allowance mailed on Feb. 24, 2010 in U.S. Appl. No. 11/470,973, Anthony J. Braskich, filed Sep. 7, 2006.
International Preliminary Report on Patentability and Written Opinion for related International Patent Application No. PCT/US2007/075439 issued on Mar. 10, 2009.
International Preliminary Report on Patentability and Written Opinion for related International Patent Application No. PCT/US2007/076592 issued on Mar. 10, 2009.
Office Action mailed on Feb. 19, 2010 in Australian Patent Application No. 2007292527.
Office Action mailed on Oct. 27, 2010 in Canadian Patent Application No. 2663171.
English Translation of Office Action mailed on May 25, 2011 in Chinese Patent Application No. 200780033314.X.
English Translation of Notice of Allowance mailed on May 8, 2012 in Chinese Patent Application No. 200780033314.X.
English Translation of Notice of Allowance mailed on Aug. 9, 2011 in Japanese Patent Application No. 2009-527475.
English Translation of Office Action mailed on Sep. 27, 2010 in Korean Patent Application No. 10-2009-7007046.
English Translation of Notice of Allowance mailed on Aug. 17, 2010 in Russian Patent Application No. 2009112643.
Office Action mailed on Mar. 5, 2010 in Australian Patent Application No. 2007292528.
English Translation of Office Action mailed on Dec. 3, 2010 in Korean Patent Application No. 10-2009-7007088.
English Translation of Office Action mailed on Aug. 6, 2010 in Russian Patent Application No. 2009112627.
Office Action mailed on Feb. 2, 2010 in Australian Patent application No. 2007292553.

(56) References Cited

OTHER PUBLICATIONS

English Translation of Office Action mailed on Sep. 19, 2010 in Chinese Patent application No. 200780033282.3.
English Translation of Office Action mailed on Dec. 31, 2011 in Chinese Patent application No. 200780033282.3.
English Translation of Office Action mailed on Sep. 27, 2011 in Japanese Patent application No. 2009-527483.
Erdem, O.M., "Efficient Self-Organized Key Management for Mobile Ad Hoc Networks," IEEE Global Telecommunications Conference 2004, vol. 4, pp. 2185-2190, 2004.
English Translation of Office Action mailed on May 8, 2012 in Japanese Patent application No. 2009-527483.
Office Action mailed on Feb. 25, 2010 in Australian Patent Application No. 2007292554.
English Translation of Office Action mailed on Mar. 24, 2011 in Chinese Patent Application No. 200780039577.1.
English Translation of Office Action mailed on Oct. 4, 2011 in Japanese Patent Application No. 2009-527484.
English Translation of Office Action mailed on Jan. 20, 2011 in Korean Patent Application No. 10-2009-7007073.
English Translation of Office Action mailed on Apr. 2, 2010 in Russian Application No. 2009112635.
English Translation of Notice of Allowance mailed on Dec. 8, 2010 in Russian Application No. 2009112635.
Extended European Search Report for counterpart International Patent Application No. PCT/US2007/075429 issued on Nov. 14, 2012.
Partridge BBN A Jackson, "Router Alert Option", Oct. 1999, XP015008494, ISSN 0000-0003.

* cited by examiner

| OUI | SUITE TYPE | AUTHENTICATION TYPE | KEY MANAGEMENT TYPE |
|---|---|---|---|
| 00-OF-AC | 5 | MESH FAST LINK ESTABLISHMENT AUTHENTICATION NEGOTIATED OVER IEEE 802.1X, OR USING PMKSA CACHING | MESH FAST LINK ESTABLISHMENT KEY MANAGEMENT |
| 00-OF-AC | 6 | MESH FAST LINK ESTABLISHMENT AUTHENTICATION USING PSK | MESH FAST LINK ESTABLISHMENT KEY MANAGEMENT |
| 00-OF-AC | 7-255 | RESERVED | RESERVED |

METHOD AND APPARATUS FOR ESTABLISHING SECURITY ASSOCIATION BETWEEN NODES OF AN AD HOC WIRELESS NETWORK

RELATED APPLICATIONS

The present application is related to the following U.S. Patents and Patent Applications commonly owned with this application by Motorola, Inc. and filed of even date herein with the present application on Sep. 7, 2006: U.S. Pat. No. 7,508,803, issued on Mar. 24, 2009, titled "Transporting Management Traffic through a Multi-Hop Mesh Network"; U.S. Patent Application Publication No. 20080063205, published Mar. 13, 2008, titled "Tunneling Security Association Messages through a Mesh network"; and U.S. Patent Application Publication No. 20080063204, published Mar. 13, 2008, titled "Method and System for Secure Processing of Authentication Key Material in an Ad Hoc Wireless Network."

FIELD OF THE INVENTION

The present invention relates generally to wireless communications and more particularly to establishing security associations between nodes within an ad hoc wireless network.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network.

As wireless communications networks become more prevalent, security continues to be a major concern to both communication network providers and end users. This is most evident when using a mobile wireless network where the security environment can offer the greatest challenges since data may be readily received and manipulated by many nodes. The radio links used in a wireless network expose the signaling and data traversing the network to eavesdroppers and/or would-be hackers. In a multi-hop wireless network, this requires each link in the meshed devices to have a unique security association established through the multi-hop authentication and key management process. Then, the air frames on the link can be protected with the established security associations.

Today's security solutions typically establish a security association between an authentication server and a node joining the network. Unfortunately, it can take ten seconds for the node to complete authentication with an authentication server. When a mobile station associates with an access point, for example, there are techniques available allowing the station to use the key material it establishes during first contact with the network to accelerate future reconnections with other access points in the network. For example, one solution currently being proposed for the IEEE 802.11r standard includes a first contact step with full authentication with an online authentication server and a base mechanism that reuses the key material established during first contact to accelerate the security handshake process. The full authentication establishes a key hierarchy for use in subsequent link establishment, thus supporting fast station transitions between access points.

When a mesh node joins a mesh network and establishes a secure link with one of its mesh neighbors, it is advantageous to provide an accelerated security mechanism enabling secure links between the mesh node and a plurality of other neighboring mesh nodes that are also members of the mesh quickly.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 illustrates authentication & key management (AKM) suites defined in a portion of the message format of FIG. 4A in accordance with some embodiments of the present invention.

Figure 1:
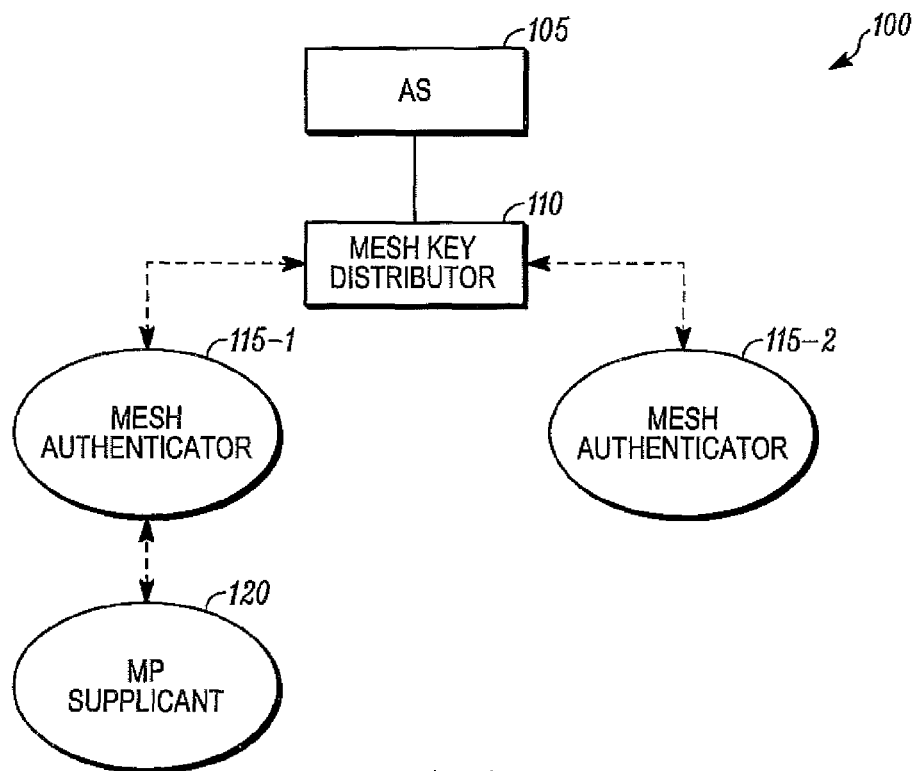
FIG. 1 illustrates an exemplary ad hoc wireless network in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to establishing a security association between nodes of an ad hoc wireless network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of establishing a security association between nodes of an ad hoc wireless network described herein. The non-processor circuits may include, but are not limited to, a radio receiver, a radio transmitter, signal drivers, clock circuits, power source circuits, and user input devices. As such, these functions may be interpreted as steps of a method to establish security associations between nodes of an ad hoc wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

An efficient security solution for a mesh network depends upon two capabilities, namely the ability for a supplicant mesh point to create a secure association with a mesh network and the ability for the supplicant to reuse key material generated at first contact to efficiently establish additional links with the mesh. The second feature avoids a particularly thorny implementation issue, namely the route establishment bottleneck that could occur if each association between members of a mesh network required the same amount of time as first contact, which can be in excess of ten seconds.

Because the number of nodes that that may reside within the neighborhood of a supplicant mesh point can be large, and because a security association is required before a node may send a routing message to its neighbor, it is important that a mechanism be in place at each mesh authenticator allowing it to communicate with a mesh key distributor to obtain derived keys based upon the key material created by a supplicant mesh point at first contact and allowing the mesh authenticator to provide the supplicant mesh point with the information it requires to identify this key material and request it be used to complete an efficient security association exchange.

The present invention includes a mesh authenticator mechanism supporting the efficient establishment of security associations. This mechanism can operate in either mesh supplicant or mesh authenticator roles, depending upon the capabilities and preferences of its neighbors, and when operating in the mesh authenticator role can relay authentication messages and request key transfers from a mesh key distributor. When implemented in accordance with the present invention, the mesh authenticator broadcasts information allowing supplicant mesh points to join a mesh and establish security associations with itself and a mesh key distributor. It also maintains keys from a key delivery hierarchy that allow it to request and unwrap keys used to establish a security association with supplicant mesh point neighbors. Finally, the authenticator supports the transport of extensible authentication protocol (EAP) authentication messages from supplicant mesh points to a key distributor and supports the delivery of key material from the mesh key distributor.

The mesh authenticator provided for in the present invention maintains two sets of derived keys, one for key transport between itself and a key distributor and a second set for communications with its peers. These sets of derived keys are created from a single master key created when the mesh authenticator performed EAP authentication with the authentication, authorization, and accounting (AAA) server. This offers an efficient method to set up a mesh authenticator, rather than requiring an explicit, separate authentication for the mesh authenticator role. The authenticator broadcasts information used by supplicant mesh points to select a mesh point authenticator in the mesh security domain that permits the use of the key hierarchy it created during first contact. It also communicates with a key distributor using layer 2 protocols and predefined data frames. The ability of the mesh authenticator to employ layer 2 protocols for communicating with the mesh key distributor allow the security protocols required to implement efficient mesh security associations.

In the present invention, efficient mesh security association (EMSA) services are used to permit efficient establishment of link security between two mesh points (MPs) in a wireless mesh network. EMSA services are provided through the use of a mesh key hierarchy, a hierarchy of derived keys that is established through the use of a Pre-Shared Key (PSK) or when a MP performs authentication. (i.e. IEEE 802.1X authentication) with a AAA server.

The operation of EMSA relies on mesh key holders, which are typically implemented at MPs within the wireless mesh network. Two types of mesh key holders are defined: mesh authenticators (MAs) and mesh key distributors (MKDs). In some embodiments of the present invention, the mesh key distributor (MKDs) for a plurality of mesh authenticators in a mesh security domain may be implemented in a central controller residing on a wired network and reachable to the plurality of mesh authenticators via a plurality of mesh points providing mesh portal services.

EMSA provides for information to be exchanged during a MP's initial association with a MA, and is referred to as "Initial EMSA Authentication." Subsequent associations to other MAs within the same mesh security domain (and the same wireless local area network (WLAN) mesh, as identified by a Mesh identification (ID)) may use an Abbreviated EMSA Handshake mechanism.

EMSA also provides mechanisms for secure communications between mesh key holders.

FIG. 1 illustrates an exemplary ad hoc wireless network 100 in accordance with some embodiments of the present invention. The ad hoc wireless network 100, for example, can be a mesh enabled architecture (MEA) network or an 802.11 network (i.e. 802.11a, 802.11b, 802.11g, or 802.11s) It will be appreciated by those of ordinary skill in the art that the communication network 100 in accordance with the present invention can alternatively comprise any packetized communication network where packets are forwarded across multiple wireless hops. For example, the ad hoc wireless network 100 can be a network utilizing packet data protocols such as OFDMA (orthogonal frequency division multiple access), TDMA (time division multiple access), GPRS (General Packet Radio Service) and EGPRS (Enhanced GPRS). Additionally, each wireless hop of the packetized communication network 100 may either employ the same packet data protocol as the other hops, or a unique packet data protocol per hop.

As illustrated in FIG. 1, the ad hoc wireless network 100 includes an authentication server (AS) 105. The authentication server 105 works to provide authentication services to the various nodes within the ad hoc wireless network 100, and will be described hereinafter. In general, the authentication server 105 performs the authentication function necessary to check the credentials of a supplicant on behalf of the authenticator and indicates whether the supplicant is authorized to access the network's services. In one embodiment of the present invention, the authentication server 105 is located in the wired network section where physical security of the host can be provided. For example, the authentication server 105 can be an extensible authentication protocol-Tunneled Transport Layer Security/extensible authentication protocol-transport layer protocol (EAP-TTLS/EAP-TLS) enabled remote authentications dial-in user service (RADIUS) server for the centralized authentication.

Communicatively coupled to the authentication server 105 is a mesh key distributor (MKD) 110. The mesh key distributor 110 derives and distributes keys to one or more mesh authenticators 115-$n$. The mesh key distributor 110 further implements an authentication, authorization, and accounting (AAA)-client and exchanges security messages with the authorization server 105.

Communicatively coupled to the mesh key distributor 110 is at least one mesh authenticator (MA) 115-$n$. Although two mesh authenticators 115-1, 115-2 are illustrated in the ad hoc wireless network 100 of FIG. 1, it will be appreciated that one or any plurality of mesh authenticators can be utilized in accordance with the present invention. The mesh authenticator 115-$n$: (a) advertises services enabling supplicants (i.e. a mesh point (MP) supplicant 120) to join; (b) provides EAP authentication message forwarding services; (c) requests or obtains derived keys from the mesh key distributor 110, allowing a supplicant 120 to join the ad hoc network 100 or establish new security associations; and (d) derives a pairwise transient key (PTK) to secure link with a supplicant 120. The mesh authenticator 115-$n$ obtains the key material used to establish a security association from the mesh key distributor 110.

As will be described herein, the present invention as implemented in a network such as the ad hoc wireless network 100 of FIG. 1, provides two types of authentication: an initial first contact step, referred to as Initial EMSA Authentication, (AAA-based authentication); and a "light-weight" step, referred to as an Abbreviated EMSA handshake that reuses key material generated during the first contact.

In operation of some embodiments of the present invention, mesh key holders, namely MAs and MKDs, manage the mesh key hierarchy by performing key derivation and secure key distribution. A mesh security domain is defined by the presence of a single MKD 110, which in some embodiments of the present invention is implemented at a mesh point (MP) in the mesh. As mentioned previously herein, within the mesh security domain, several MAs 115-$n$ may exist, each implemented at an MP, and each MA 115-$n$ maintains both a route to and a security association with the MKD 110.

The MKD 110 derives keys to create a mesh key hierarchy, and distributes derived keys to MAs 115-$n$. In some embodiments of the present invention, the device implementing the MKD entity also implements a MA entity. The MA 115-$n$ participates in Efficient Mesh Security Association (EMSA) exchanges initiated by the supplicant MP 120 (including Initial EMSA Authentication and the Abbreviated EMSA handshake). The MA 115-$n$ receives derived keys from the MKD 110, and derives additional keys for use in securing a link with a supplicant MP 120.

Figure 2:
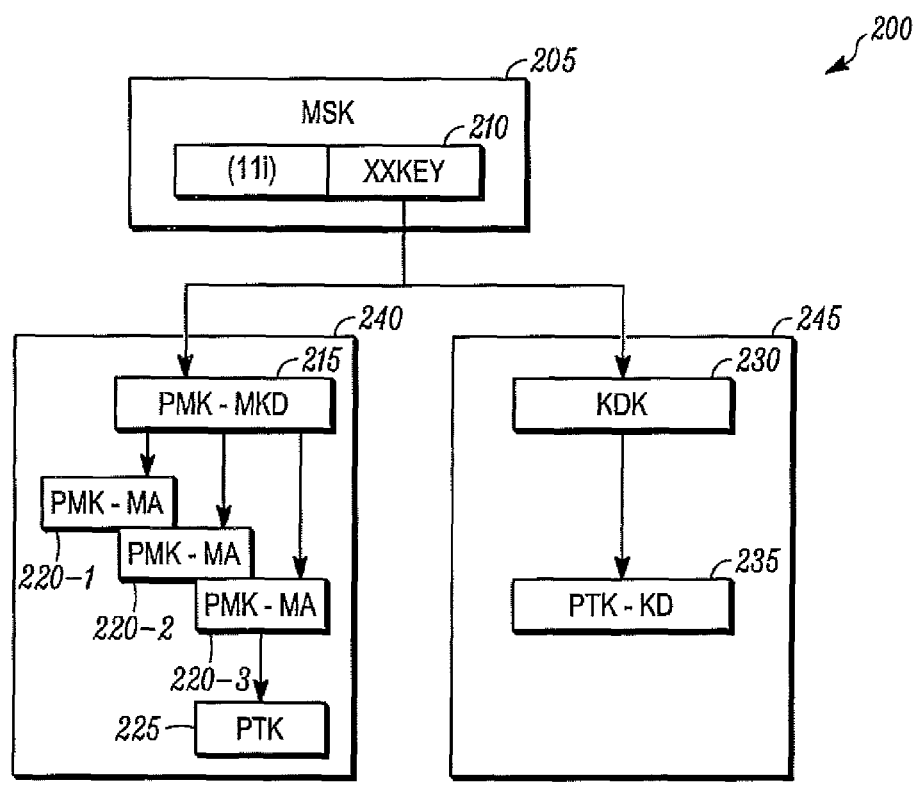
FIG. 2 illustrates a mesh key hierarchy for implementation of some embodiments of the present invention within the network of FIG. 1.

FIG. 2 illustrates a mesh key hierarchy 200 for implementation of some embodiments of the present invention. The mesh key hierarchy permits a MP to create secure associations with peer MPs without the need to perform an IEEE 802.1X authentication each time. The mesh key hierarchy can be used with either IEEE 802.1X authentication or pairwise session key (PSK). It is assumed for exemplary purposes herein that the PSK is specific to a single MP and a single MKD.

The key hierarchy of the present invention consists of two branches for use within a mesh. A link security branch 240 consists of three levels, supporting distribution of keys between mesh key holders to permit the Abbreviated EMSA handshake between a supplicant MP and a MA. A key distribution branch 245 provides keys to secure the transport and management of keys between mesh key holders.

As illustrated in FIG. 2, a master session key (MSK) 205 is created for each supplicant when it joins a mesh. The master session key 205 is keying material that is generated during a MP's extensible authentication protocol (EAP) authentication and delivered to a mesh key distributor 110 (e.g., via remote authentication dial-in user service (RADIUS)). An XXKey 210 is a portion of MSK 205. The XXKey 210 is either the pairwise session key (PSK) or the second 256 bits of the master session key (MSK).

The mesh key distributor 110 generates a first level key for both branches from either the PSK or from the MSK resulting from a successful IEEE 802.1X Authentication between the AS 105 and the supplicant MP 120. For example, as illustrated, the first derived key, the Pairwise Master Key Mesh Key Distributor (PMK-MKD) 215, is derived as a function of the MSK or PSK and the Mesh ID. It is stored by the supplicant MP 120 and the PMK-MKD key holder, namely the MKD 110. This key is mutually derived by the supplicant MP 120 and the MKD 110. There is only a single PMK-MKD 215 derived between the supplicant MP 120 and the mesh security domain.

The mesh key distributor 110 uses a key derivation function (KDF) to generate the keys in the key hierarchy. A key derivation function is a function that accepts as input both a secret key (known a master key) and non-secret information, and outputs a new secret key known as a derived key. The key derivation function is non-reversible, so that knowledge of both the derived key and the non-secret information does not provide any information about the master key.

The top level key of the mesh key hierarchy link security branch 240, PMK-MKD 215 binds the supplicant MAC address (SPA), mesh security domain Identifier, and Mesh ID with the keying material resulting from the negotiated AKM. The PMK-MKD 215 is derived as follows:

PMK-MKD=KDF-256(XXKey, "MKD Key Derivation", MeshIDlength‖MeshID‖MSD-ID‖0x00‖SPA)

where

KDF-256 is a KDF used to generate a key of length 256 bits

The XXKey is either the second 256 bits of the MSK or the PSK.

"MKD Key Derivation" is 0x4D4B44204B6579204465726976617469F6E

MeshIDLength is a single octet whose value is the number of octets in the Mesh ID.

Mesh ID is the mesh identifier, a variable length sequence of octets, as it appears in the Beacons and Probe Responses.

MSD-ID is the 48-octet mesh security domain identifier field from the Mesh Security Domain information element that was used during Initial EMSA Authentication.

SPA is the supplicant MP's MAC address.

The PMK-MKD is referenced and named as follows:

PMK-MKDName=Truncate-128(SHA-256("MKD Key Name" MeshIDlength‖MeshID‖MSD-ID‖0x00‖SPA ANonce))

where

"MKD Key Name" is 0x4D4B44204B6579204E616D65.

ANonce is an unpredictable random value generated by the PMK-MKD holder (MKD), delivered along with PMK-MA to the MA, and provided by the MA to the supplicant MP during Initial EMSA Authentication.

Truncate-128(-) returns the first 128 bits of its argument, and securely destroys the remainder.

The MKD 110 also generates a second derived key, the Pairwise Master Key Mesh Authenticator (PMK-MA) 220-$n$ to enable fast security association. The MKD 110 derives a unique PMK-MA 220-$n$, as required, for each MA 115-$n$. The PMK-MA 220-$n$ is distributed to appropriate MA 115-$n$. For example, as illustrated in FIG. 2, the PMK-MA 220-1 is distributed to the MA 115-1. The PMK-MA 220-$n$ is mutually derived by the supplicant MP 120 and the MKD 110. It is delivered by the MKD 110 to a MA 115-$n$ to permit completion of a mesh handshake between the supplicant MP 120 and the MA 115-$n$.

The second level key of the mesh key hierarchy link security branch 240, PMK-MA 220-$n$, is a 256-bit key used to derive the PTK 225. The PMK-MA 220-$n$ binds the SPA, MKD, and MA and is derived as follows:

PMK-MA=KDF-256(PMK-MKD, "MA Key Derivation", PMK-MKDName‖MA-ID‖0x00‖SPA)

where

KDF-256 is the KDF used to generate a key of length 256 bits.

"MA Key Derivation" is 0x4D41204B6579204465726976617469F6E.

MA-ID is the identifier of the holder of PMK-MA (MA).

SPA is the supplicant MP's MAC address.

The PMK-MA is referenced and named as follows:

PMK-MAName=Truncate-128(SHA-256("MA Key Name"‖PMK-MKDName‖MA-ID‖0x00‖SPA))

where "MA Key Name" is 0x4D41204B6579204E616D65.

A transient key, the Pairwise transient key (PTK) 225, is mutually derived from the PMK-MA 220-$n$ by the MA 115-$n$ and the supplicant MP 120. The PTK 225 is the third level of the link security branch that defines the IEEE 802.11 and IEEE 802.1X protection keys. The PTK 225 is mutually derived by the supplicant 120 and the PMK-MA key holder, namely the MA 115-$n$.

The third level key of the mesh key hierarchy link security branch 240 is the PTK 225. This key is mutually derived by the Supplicant MP and the MA with the key length being a function of negotiated cipher suites.

The PTK derivation is as follows:

PTK=KDF-PTKLen(PMK-MA, "Mesh PTK Key derivation", SNonce ANonce‖SPA‖MAA‖PMK-MAName)

where

KDF-PTKLen is the KDF used to generate a PTK of length PTKLen.

PMK-MA is the key that is shared between the Supplicant MP and the MA

"Mesh PTK Key derivation" is 0x4D657368 2050544B204B6579206465726976617469F6E.

SNonce is a 256 bit random bit string contributed by the Supplicant MP

ANonce is a 256 bit random string contributed by the MKD or MA

SPA is the Supplicant MP's MAC address

MAA is the MAC address of the MA.

PMK-MAName is as derived previously

PTKlen is the total number of bits to derive, e.g., number of bits of the PTK. The length is dependent on negotiated cipher suites.

Each PTK comprises three associated keys, the key confirmation key (KCK), the key encryption key (KEK), and the temporal key (TK).

The PTK is referenced and named as follows:

PTKName=Truncate-128(SHA-256(PMK-MAName‖"Mesh PTK Name"‖SNonce‖ANonce‖MAA‖SPA))

where "Mesh PTK Name" is 0x4D6573682050544B204E616D65.

The second branch, the key distribution branch 245, consists of two levels and results in a PTK-KD 235 for use in allowing an MP to become a MA, and in securing communications between a MA and the MKD. The key distribution key (KDK) 230 is the first level of the key distribution branch 245. This key is derived as a function of the MSK or PSK and the Mesh ID and stored by the supplicant MP 120 and the MKD 110. This key is mutually derived by the supplicant MP 120 and the MKD 110. There is only a single KDK 230 derived between the supplicant MP and the mesh security domain.

The first level key of the key distribution branch 245, KDK 230 binds the MA-ID (the MAC address of the MP establishing the KDK to become a MA), mesh security domain identifier, and Mesh ID with the keying material resulting from the negotiated AKM. The KDK is used to derive the PTK-KD.

KDK is derived as follows:
KDK=KDF-256(XXKey, "Mesh Key Distribution Key", MeshIDLength MeshID‖MSD-ID‖0x00‖MA-ID)
where
KDF-256 is a KDF used to generate a key of length 256 bits.
The XXKey is either the second 256 bits of the MSK or the PSK.
"Mesh Key Distribution Key" is 0x4D657368204B65792044697374726962757469 6F6E204B6579.
MeshIDLength is a single octet whose value is the number of octets in the Mesh ID.
Mesh ID is the mesh identifier, a variable length sequence of octets, as it appears in the Beacons and Probe Responses.
MSD-ID is the 48-octet mesh security domain identifier field from the Mesh Security Domain information element that was used during Initial EMSA Authentication.
MA-ID is the MAC address of the MP deriving the KDK for use in securing communications with the MKD.
The KDK is referenced and named as follows:
KDKName=Truncate-128(SHA-256("KDK Name"‖MeshIDLength MeshID‖MSD-ID‖0x00‖MA-ID))
where
"KDK Name" is 0x4B444B204E616D65.
Truncate-128(-) returns the first 128 bits of its argument, and securely destroys the remainder.

The pairwise transient key-key distribution (PTK-KD) 235 is the second level of the key distribution branch that defines protection keys for communication between MA 115-$n$ and the MKD 110. The PTK-KD 235 is mutually derived by the supplicant MP (when it becomes a MA 115-$n$) and the MKD 110.

The second level key of the key distribution branch 245, PTK-KD 235, is a 256-bit key that is mutually derived by a MA and a MKD. The PTK-KD is derived as follows:
PTK-KD=KDF-256(KDK, "Mesh PTK-KD Key", MA-Nonce‖MKD-Nonce‖MA-ID‖MKD-ID)
where
KDK is the key defined previously herein
"Mesh PTK-KD Key" is 0x4D6573682050544B2D4B44204B6579.
MA-Nonce is a 256-bit random string contributed by the MA.
MKD-Nonce is a 256-bit random string contributed by the MKD.
MA-ID is the MAC address of the MA.
MKD-ID is the MAC address of the MKD.

The PTK-KD has two associated keys, the Key confirmation key-key distribution (KCK-KD) and the Key encryption key-key distribution (KEK-KD), derived as follows:
The KCK-KD is computed as the first 128 bits (bits 0-127) of the PTK-KD:
KCK-KD=L(PTK-KD, 0, 128)
where L(-) is defined in 8.5.1.
The KCK-KD is used to provide data origin authenticity in messages exchanged between MA and MKD.
The KEK-KD is computed as bits 128-255 of the PTK-KD:
KEK-KD=L(PTK-KD, 128, 128)
The KEK-KD is used to provide data confidentiality in messages exchanged between MA and MKD.
The PTK-KD is referenced and named as follows:
PTK-KDName=Truncate-128(SHA-256 (KDKName‖"PTK-KD Name"‖MA-Nonce‖MKD-Nonce‖MA-ID‖MKD-ID))
Where "PTK-KD Name" is 0x50544B2D4B44204E616D65.

The lifetime of all keys derived from the PSK or MSK are bound to the lifetime of the PSK or MSK. For example, the 802.1X AS 105 may communicate the MSK key lifetime with the MSK 205. If such an attribute is provided, the lifetimes of the PMK-MKD 215 and KDK 230 will not be more than the lifetime of the MSK 205. The lifetime of the PTK 225 and PMK-MA 220-$n$ are the same as that of the PMK-MKD 215 and the lifetime of the PTK-KD 235 is the same as that of the KDK 230, as calculated above. When the key lifetime expires, each key holder deletes their respective derived keys.

The construction of the key hierarchy ensures that compromise of keying material within the link security branch is isolated to only that portion, or sub-branch, of the hierarchy. For example, a mesh authenticator only has knowledge to decrypt those sessions protected by the PTK derived from its PMK-MA.

In some key management systems, PMK-MKD key may be deleted by the MKD after PMK-MA keys have been derived. Such an operation lends itself to the good security practice of protecting the key hierarchy in cases where the PMK-MKD is no longer needed. In such cases, the key management system only needs to maintain information about the PMK-MA keys. Such a removal of the PMK-MKD key does not indicate the invalidity of the key hierarchy.

Figure 3:
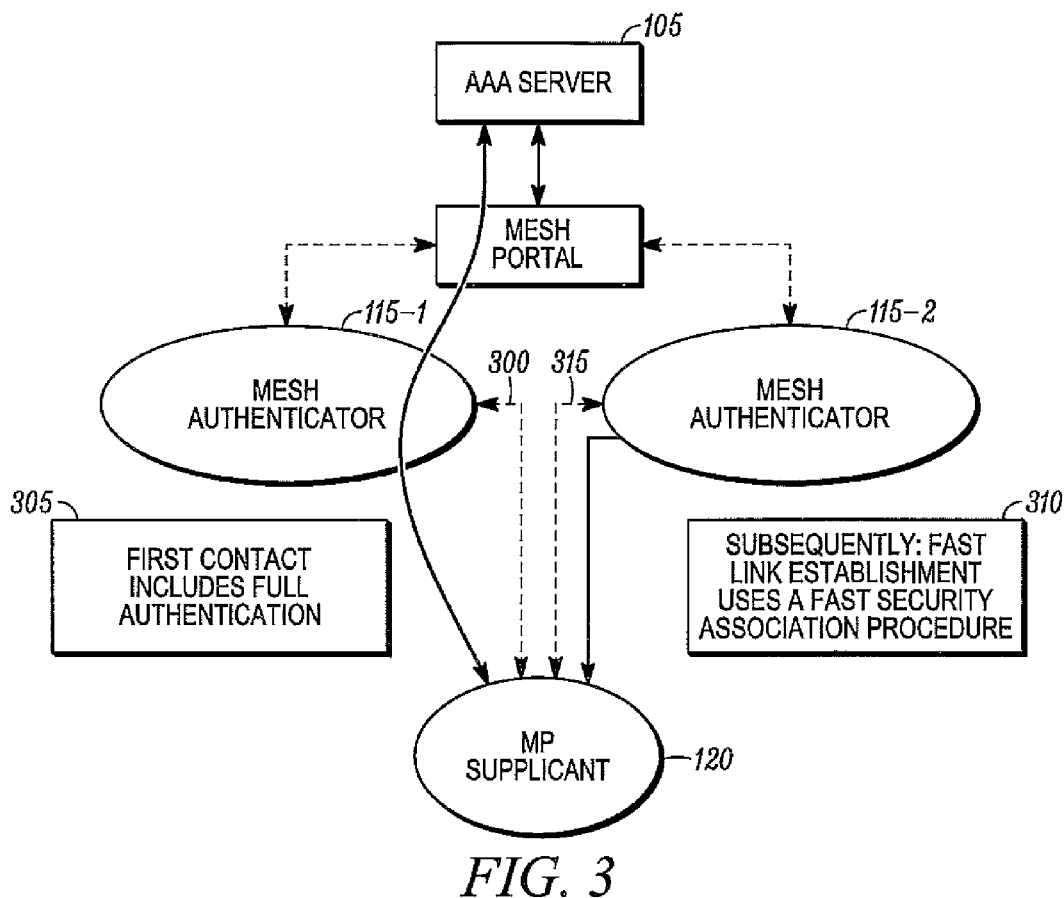
FIG. 3 summarizes the various services provided by a mesh authenticator to a supplicant mesh point within the network of FIG. 1 in accordance with some embodiments of the present invention.

FIG. 3 summarizes the various services provided by each mesh authenticator 115-$n$ to each supplicant mesh point 120. As illustrated, the mesh authenticators 115-$n$ provide the following services to supplicant mesh points 120: Discovery (300), First Contact (305), Fast Security Association (310), and Key Holder (315).

For discovery 300, the MA advertises its capabilities and configuration to peers using broadcast beacon frames and unicast probe response frames. Through the use of beacon and probe responses the MA permits supplicant MPs to discover that the MA supports EMSA services. By providing the Mesh ID and Mesh Security Domain IDs, the MA allows the supplicant to determine if the key hierarchy it created during first contact will be available at the MA.

Figure 4A:
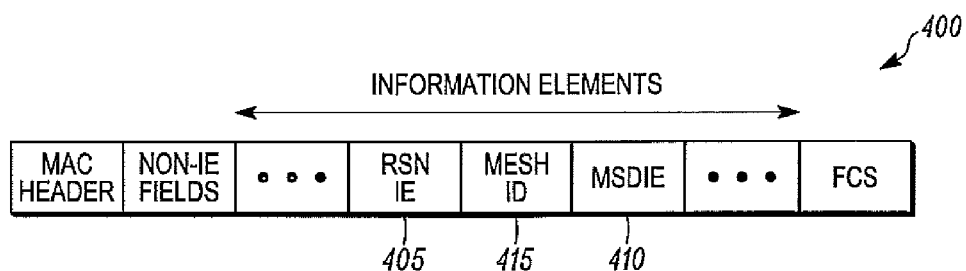
FIG. 4A illustrates a message format for beacon and probe response frames within the network of FIG. 1 in accordance with some embodiments of the present invention.

FIG. 4A illustrates a message format 400 for beacon and probe response frames. As illustrated, a MP supporting mesh fast link establishment includes in its beacons and probe responses 400 a robust security network information element (RSN IE) 405 advertising support for authentication and key management (AKM) suite type 5 and/or 6, and a Mesh Security Domain information element (MSDIE) 410. The RSN IE 405 advertises capability to use mesh fast link key hierarchy in an AKM suites list. The MSDIE 410 along with the Mesh ID 415 provides information to the supplicant to ensure its key hierarchy is available at the MA advertising the beacon 400. The Mesh Security Domain information element 410 contains the Mesh Security Domain Identifier. A mesh authenticator uses the Mesh Security Domain information element 410 to advertise its status as a MA, and to advertise that it is included in the group of MAs that constitute a mesh security domain.

Figure 4B:
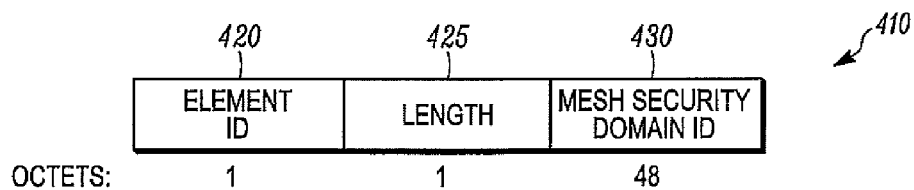
FIG. 4B is a block diagram illustrating an exemplary field structure of a Mesh Security Domain information element of the message format of FIG. 4A in accordance with some embodiments of the present invention.

FIG. 4B is a block diagram illustrates an exemplary field structure of a Mesh Security Domain information element (MSDIE) 410, which is used by a mesh authenticator to advertise its status as a MA and to advertise that it is included in the group of MAs that constitute a mesh security domain. Block 420 is an Information Element (IE) Identification (ID) field that identifies a particular Efficient Mesh Security Association Information Element (EMSAIE) as will be discussed in further detail hereinafter. Block 425 is a Length field, which defines a length of the EMSAIE. Block 430 contains a mesh security domain identifier value.

FIG. 5 illustrates authentication & key management (AKM) suites 500 defined in the RSN IE 405. As described previously herein, the RSN IE 405 is advertised in beacons and probe responses 400 and appears in message exchanges to facilitate first contact and fast security associations.

Figure 6:
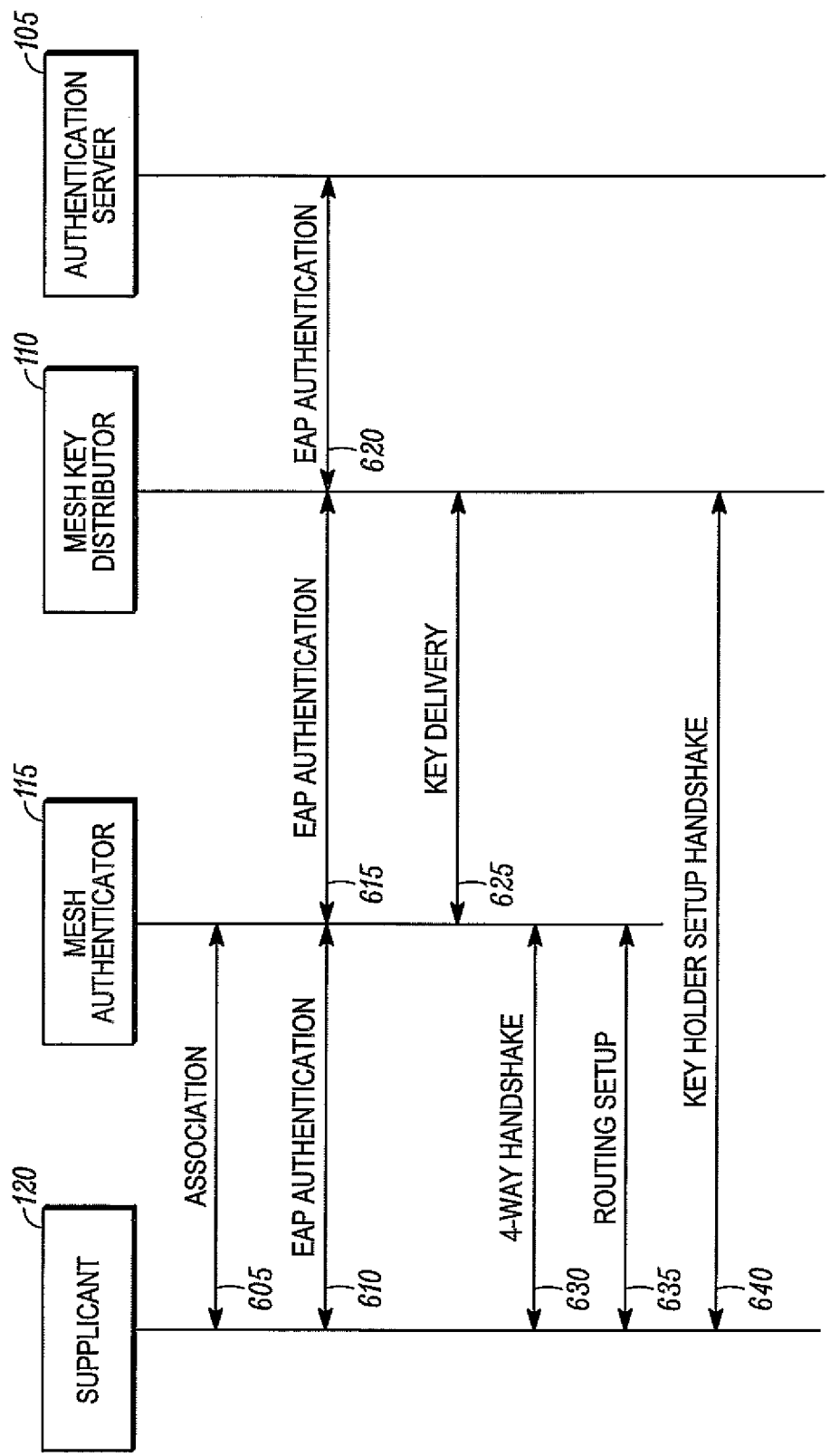
FIG. 6 is a message sequence chart illustrating exemplary interactions between elements of the network of FIG. 1 in accordance with some embodiments of the present invention.

FIG. 6 is a messaging diagram 600 illustrating a first contact for fast authenticator services in accordance with some embodiments of the present invention. During this first authentication in a mesh, a MP enables the use of the mesh key hierarchy to support the Abbreviated EMSA Handshake when securing future links. This is referred to as the Initial EMSA Authentication Mechanism, and contains communication exchanged between an MP and a MA with which it is associating.

In this sequence, a MP issues an association request containing an indication (the MSDIE) that it wishes to establish the mesh key hierarchy. The MP receives an association response message containing information required for the MP to perform key derivations and establish link security. If required, 802.1X authentication occurs next, followed by an EMSA 4-way handshake.

As illustrated, an association 605, in accordance with 802.11 management techniques for example, between a supplicant 120 and a mesh authenticator 115 occurs in response to the mesh authenticator 115 advertising its services enabling the supplicant 120 to join. Next, the mesh authenticator 115 enables the supplicant 120 to perform EAP authentication. An EAP authentication 610 is performed between the supplicant 120 and the mesh authenticator 115, for example using EAPOL. An EAP authentication 615 is also performed between the mesh authenticator 115 and a mesh key distributor 110, for example using EAP. An EAP authentication 620 is also performed between the mesh key distributor 110 and an authentication server 105, for example using EAP over RADIUS. Next, a key delivery 625 occurs in which the mesh authenticator 115 obtains a derived key from the mesh key distributor 110 to enable handshake with the supplicant 120 as described previously herein. Next, the mesh authenticator 115 derives PTK to secure a link with the supplicant 120 using a 4 way handshake 630 such as by EAPOL. Next, a routing setup 635 takes place between the supplicant 120 and the mesh authenticator 115. Lastly a key holder setup handshake 640 is performed between the supplicant 120 and the mesh key distributor 110.

Figure 7A:
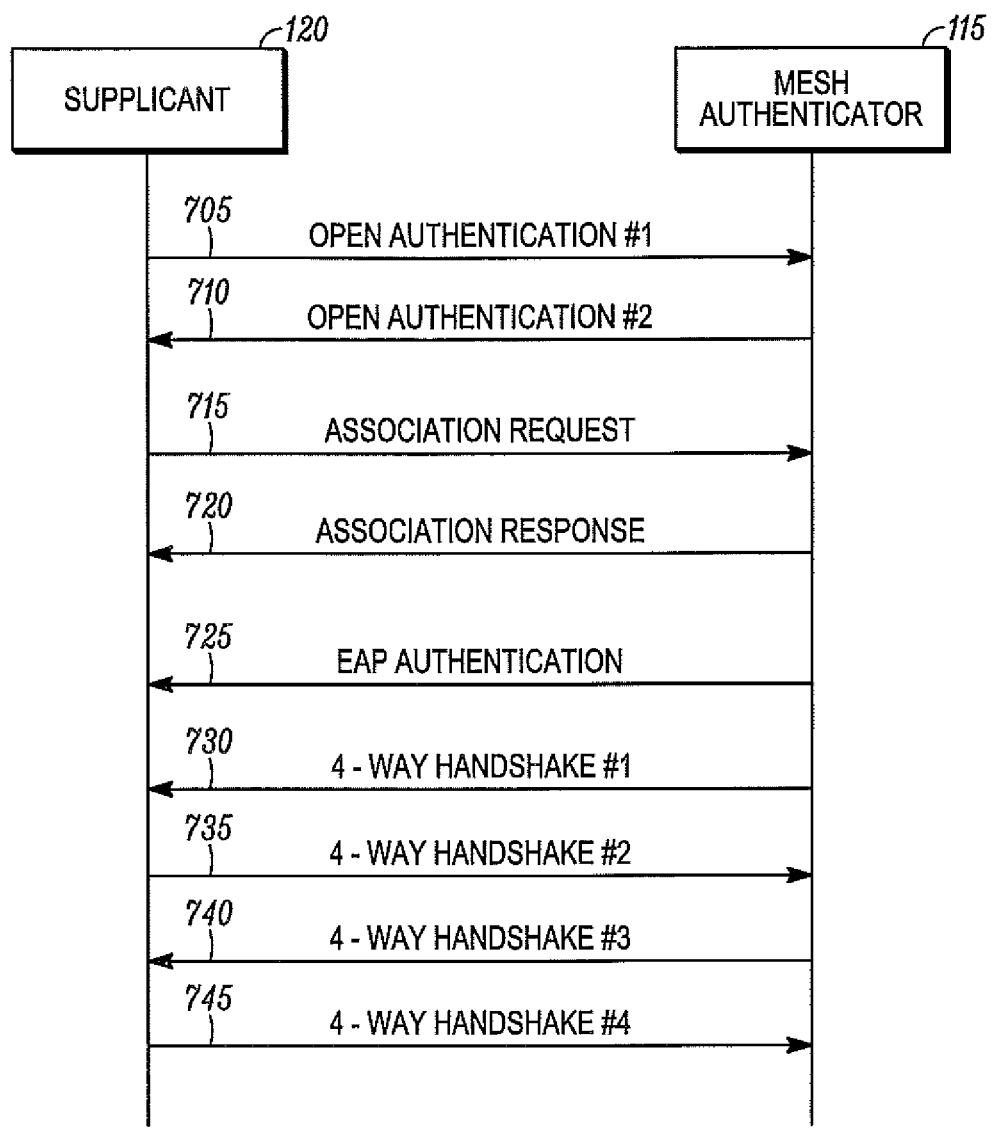
FIG. 7A illustrates further detail of the exemplary interactions of FIG. 6 in accordance with some embodiments of the present invention.

FIG. 7A illustrates further detail of the message communication between the supplicant 120 and the mesh authenticator 115 at first contact as described previously herein for FIG. 6. As illustrated by message signals 705 and 710 of FIG. 7A, an open authentication occurs first. For example, the open authentication can be in accordance with 802.11 standards. Open authentication allows any device to authenticate and then attempt to communicate with the mesh authenticator. Using open authentication, any wireless device can authenticate with the mesh authenticator, but the device can communicate with the mesh authenticator using only certain message types, such as an association request. Open authentication does not rely on an authentication server 105 of the network 100. As illustrated, using open authentication, the supplicant 120 sends an authentication request 705 to the mesh authenticator 115, and in return the mesh authenticator 115 sends an authentication response to the supplicant 120.

Next, as illustrated in FIG. 7A, the supplicant 120 sends an association request 715 to the mesh authenticator (MA) 115. The association request 715 includes an MSDIE 410 exactly as advertised by the mesh authenticator 115; and a RSN IE 405 which contains the security capabilities of the supplicant with the PMKID list empty. The mesh authenticator 115 replies with an association response 720. The association response 720 includes an MSDIE 410 exactly as advertised by the mesh authenticator 115. The association response 720 further includes an efficient mesh security association information element (EMSAIE) containing: a MKD-ID identifying the MKD 110 with which the MA 115 has a pre-existing security association, a MA-ID identifying the MA 115 sending the message, and all other fields set to zero. The association response 720 also includes a RSN IE 405 which describes the security capabilities of the MA 115, with the PMKID list empty.

Figure 7B:
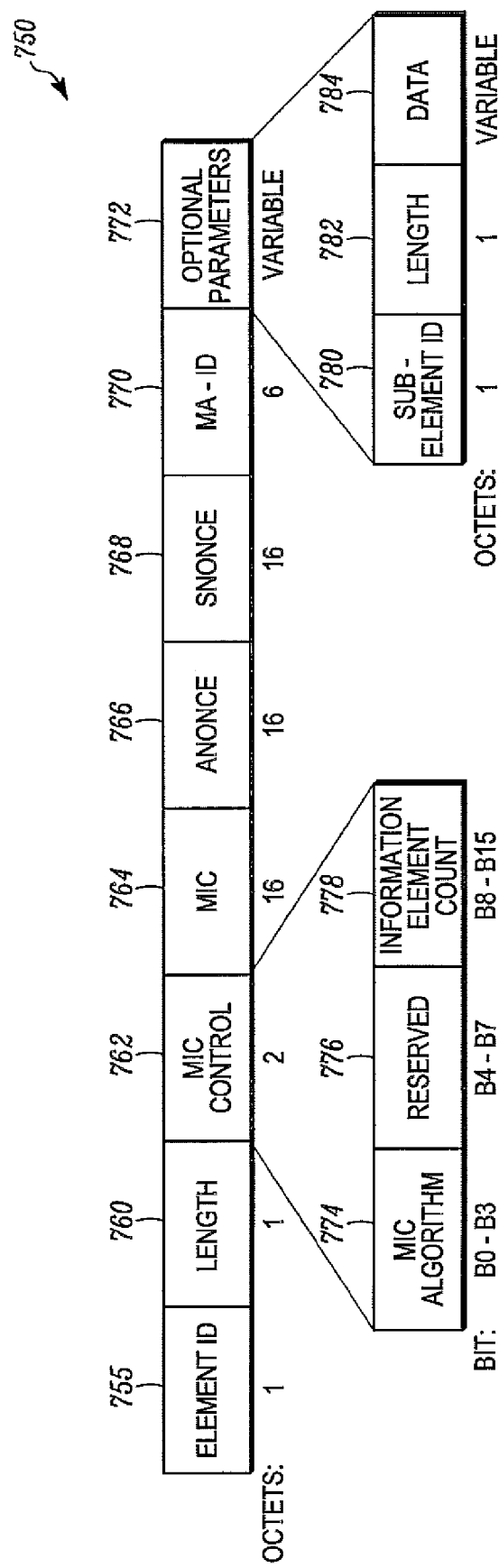
FIG. 7B is a block diagram illustrating an exemplary field structure of an Efficient Mesh Security Association Information Element for use in the exemplary interactions of FIGS. 6 and 7A in accordance with some embodiments of the present invention.

FIG. 7B is a block diagram illustrating an exemplary field structure of an Efficient Mesh Security Association Information Element (EMSAIE), which is used in the authentication sequence during an Abbreviated EMSA handshake, according to some embodiments of the present invention. Block 755 is an Information Element (IE) Identification (ID) field that identifies a particular EMSAIE. Block 760 is a Length field, which defines a length of the EMSAIE. Block 762 is a message integrity code (MIC) Control field that comprises a reserved field 776, a MIC algorithm field 774, and an Information element count field 778, which includes the number of information elements that are included in the MIC calculation. Block 764 is a MIC field that includes a MIC value calculated using an algorithm selected by the MIC algorithm field of the MIC Control field. Block 766 is an ANonce field that contains a nonce value chosen by the mesh authenticator. Block 768 is an SNonce field that includes a nonce value chosen by the supplicant. Block 770 is a MA-ID field that includes the MAC address of the mesh authenticator.

Block 772 is an optional parameters field which may contain one or more information parameters. Each information parameter comprises block 780, a sub-element identifier that identifies the type of information, a length block 782 identifying the length of the information, and a data block 784 containing the information.

Referring back to FIG. 7A, after successful association, the supplicant MP and the MA proceed with IEEE 802.1X authentication, if required. The IEEE 802.1X exchange is sent between the supplicant MP and the MA using EAPOL messages carried in IEEE 802.11 data frames. The MA initiates the IEEE 802.1X exchange with the supplicant MP and transports the 802.1X exchange to the MKD using the mesh EAP message transport protocol.

Unless a pre-shared key is in use, EAP authentication 725 occurs between the supplicant 120 and an online AAA server 105 with the MA 115 facilitating transport of the EAP messages. If the supplicant 120 is accepted following EAP authentication 725, the MA 115 obtains the PMK-MA 220 for the supplicant 120. If the supplicant 120 is rejected, the MA 115 will follow a procedure such as disassociating the supplicant 120.

Upon successful completion of the IEEE 802.1X authentication, the MKD receives the MSK and authorization attributes associated with it and with the supplicant MP. If a mesh key hierarchy already exists for this supplicant, the MKD shall delete the old PMK-MKD and PMK-MA security associations. It then calculates the PMK-MKD and PMK-MKDName. The PMK-MKD security association includes:
  MSD-ID
  PMK-MKD
  PMK-MKDName
  SPA, and
  authorization information including PMK-MKD lifetime.
The MKD then generates a PMK-MA for the MA. The PMK-MA security association includes:

PMK-MA,
PMK-MA lifetime,
PMK-MAName,
MA-ID,
PMK-MKDName, and
SPA

The MKD then delivers the PMK-MA to the MA. Once the PMK-MA is delivered, the MA and supplicant MP then perform an EMSA 4-way handshake (730, 735, 740, 745). The 4-way Handshake is initiated by the MA 115 and is performed, for example, in accordance with 802.11 standards. The handshake is carried using EAPOL-Key messages. For example, the handshake messaging can be implemented in accordance with 802.11 standards.

The 4-way handshake #1 message 730 comprises an EAPOL-Key message containing an ANonce, where the ANonce is the value received by MA 115 from the MKD 110 during delivery of the PMK-MA 220 (it is the value used by MKD 110 to perform key derivations for the supplicant 120.)

After receiving the 4-way handshake #1 message 730, the supplicant 120 creates a random nonce (SNonce) and computes the PTK 225.

The 4-way handshake #2 message 735 comprises an EAPOL-Key message containing: SNonce, MIC, RSNIE, MSDIE, EMSAIE, and GTK KDE.
where:
SNonce is the random nonce selected by the supplicant 120.
MIC is a message integrity code calculated over the body of the EAPOL-Key message (with MIC field=0).
RSNIE: PMKID field contains PMK-MAName. All other fields match the RSNIE in the Association Request message.
MSDIE: exactly as in Association Response
EMSAIE: exactly as in Association Response
GTK KDE is a group temporal key data encapsulation that contains the GTK of the supplicant 120

As is well known in the art, the MIC is a calculated value that may accompany data to provide assurance about its integrity. The inputs to a MIC calculation include data to be protected, and a secret key. The MIC provides data origin authenticity and message integrity to a recipient. Data origin authenticity assures the recipient that the sender was someone possessing the secret key. When only two parties know the secret key, it provides the recipient assurance of the identity of the sender. Message integrity assures the recipient that the protected data were not modified during transmission. As used in this specification, a MIC is analogous to a "message authentication code" as is known in the field of cryptography. Those skilled in the art will appreciate that operations of a MIC, according to some embodiments of the present invention, could also be performed using various other types of data origin information that can provide data origin authenticity and message integrity.

After receiving the 4-way handshake #2 message 735, the MA 115 computes the PTK 225 and verifies the MIC. The MA 115 calculates PMK-MAName and verifies it matches the value sent in the 4-way handshake #2 message 735. The MA 115 verifies the other contents are as expected. Finally, the MA 115 installs the GTK for use in decrypting multicast traffic from the supplicant 120.

The 4-way handshake #3 message 740 comprises an EAPOL-Key message containing: ANonce, MIC, RSNIE, MSDIE, EMSAIE, GTK KDE, and Lifetime KDE.

where:
ANonce is identical to the value in handshake message #1.
MIC is calculated over the body of the EAPOL-Key frame (with MIC field=0).
RSNIE: PMKID field contains PMK-MAName. All other fields match the RSNIE in the Association Response message.
MSDIE: exactly as in Association Response
EMSAIE: exactly as in Association Response
GTK KDE is a group temporal key data encapsulation that contains the GTK of the MA 115.
Lifetime KDE is a 4-octet field that contains the number of seconds remaining in the lifetime of the PMK-MA.

After receiving the 4-way handshake #3 message 740, the supplicant 120 verifies the MIC and verifies the contents are as expected. The supplicant 120 installs the GTK for use in decrypting multicast traffic from the MA.

The 4-way handshake #4 message 745 comprises an EAPOL-Key message containing a MIC, where the MIC is calculated over the body of the EAPOL-Key frame (with MIC field=0).

After receiving the 4-way handshake #4 message 745, the MA 115 verifies the MIC. If valid, the MA 115 installs the PTK 225 for communication with the supplicant 120.

After successful completion of the procedure, the supplicant 120 and the mesh authenticator 115 are associated, and the PTK 225 is used for protection of data traffic between the two mesh points (i.e. the supplicant 120 and the mesh authenticator 115). The MA 115 allows the supplicant 120 to send traffic via the 802.1X controlled port, which requires that traffic be protected using the PTK 225.

Figure 8:
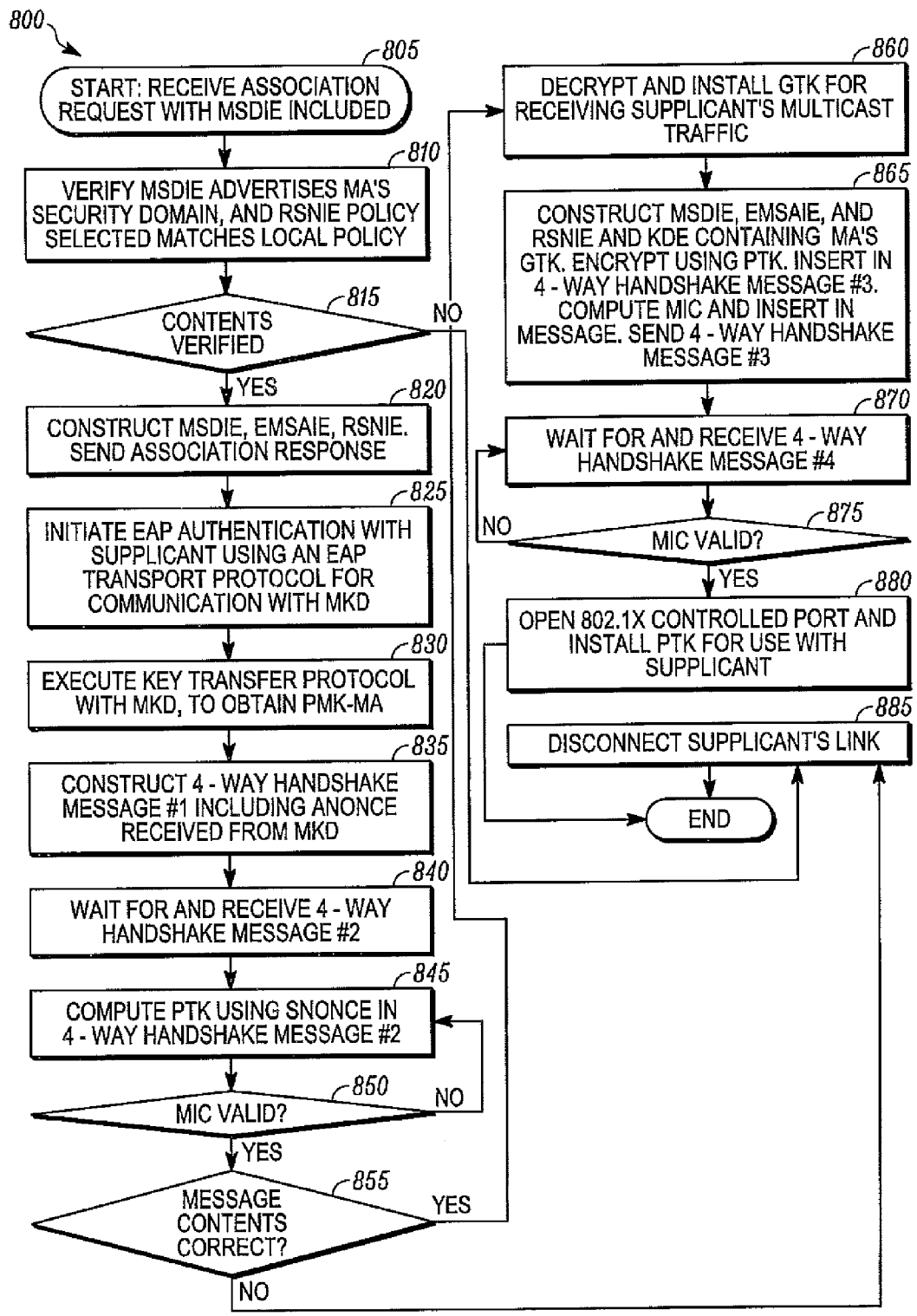
FIG. 8 is a flowchart illustrating an exemplary operation of a mesh authenticator operating within the network of FIG. 1 in accordance with some embodiments of the present invention.

FIG. 8 is a flowchart illustrating an exemplary operation 800 of a mesh authenticator during first contact in accordance with some embodiments of the present invention. As illustrated, the operation begins in Step 805 in which the mesh authenticator receives an association request from a supplicant with an MSDIE included. Next, in Step 810, the mesh authenticator verifies the MSDIE advertises the mesh authenticator's security domain, and also verifies the RSNIE policy selected matches the local policy. Next, in Step 815, it is determined whether all contents were acceptably verified. If the contents were not verified, the operation proceeds to Step 885 in which the supplicant's link is disconnected and the operation ends.

When the contents are verified in Step 815, the operation continues to Step 820 in which the mesh authenticator constructs MSDIE, EMSAIE, and RSNIE and uses for sending an association response. In other words, the mesh authenticator associates with the supplicant to permit authentication. The mesh authenticator provides key context to the supplicant enabling supplicant to derive a key (PMK-MA).

Next, in Step 825, the mesh authenticator initiates EAP authentication with the supplicant using an EAP transport protocol for communication with the MKD. In other words, the MA transports EAP messages received from the supplicant to AAA-client, and vice-versa, enabling supplicant's authentication. Next, in Step 830, the mesh authenticator executes key transfer protocol with the MKD to obtain PMK-MA. The MA obtains the derived key on behalf of the supplicant.

Next, in Step 835, the mesh authenticator constructs the 4-way handshake #1 message including ANonce received from the MKD. Next, in Step 840, the mesh authenticator waits for and receives the 4-way handshake #2 message. Next, the mesh authenticator computes PTK using SNonce in the 4-way handshake #2 message. In Step 850, the mesh authenticator confirms that the MIC is valid. When it is not valid, the operation returns to Step 845. When it is valid, the mesh authenticator determines if the message contents are correct in Step 855. When the message contents are not correct, the operation proceeds to Step 885 in which the supplicant's link is disconnected and the operation ends.

When the message contents are correct, the operation proceeds to Step 860 in which the mesh authenticator decrypts and installs GTK for receiving supplicant's multicast traffic. Next, in Step 865, the mesh authenticator constructs MSDIE, EMSAIE, RSNIE, and key data encapsulation (KDE) containing the MA's GTK. The mesh authenticator further encrypts using PTK and inserts these in 4-way handshake #3 message. The mesh authenticator further computes MIC and inserts in the message, and then sends the message to the supplicant.

Next, in Step 870, the mesh authenticator waits for and receives the 4-way handshake #4 message. Then, in Step 875, the mesh authenticator determines whether the MIC is valid. When the MIC is not valid, the operation cycles back to Step 870. When the MIC is valid, the operation continues to Step 880 in which the mesh authenticator opens an 802.1X controlled port and installs PTK for use with the supplicant. The operation then ends.

Figure 9:
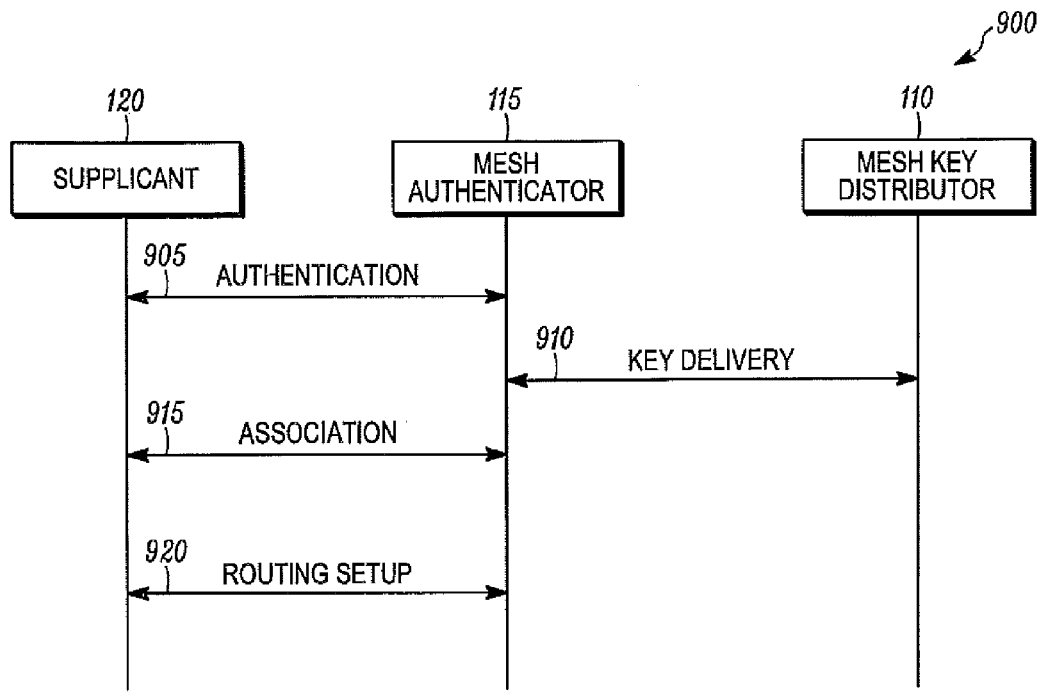
FIG. 9 illustrates a message sequence chart illustrating interactions between elements of the network of FIG. 1 in accordance with some embodiments of the present invention.

FIG. 9 illustrates a messaging diagram of an exemplary network operation 900 during fast security associations in accordance with some embodiments of the present invention. The Abbreviated EMSA Handshake mechanism may commence after a supplicant MP that has completed an Initial EMSA Authentication completes its discovery and selection procedures. The mechanism permits a supplicant MP to exchange nonces with a MA and establish a PTK prior to association.

The supplicant MP does not initiate the abbreviated EMSA handshake with a MA unless the MA is a member of the mesh security domain (as advertised by the MSDIE) and the mesh (as advertised by the Mesh ID IE) in which the supplicant MP performed Initial EMSA Authentication. To perform the Abbreviated EMSA Handshake mechanism, the supplicant MP initiates a four-message exchange.

As illustrated in FIG. 9, after the mesh authenticator advertises services enabling the supplicant to join, the operation begins with the supplicant 120 and the mesh authenticator 115 exchanging authentication messages 905, for example, using authentication management frames in accordance with 802.11 standards. Next, key delivery 910 between the mesh authenticator 115 and the mesh key distributor 110 is performed in which the mesh authenticator 115 obtains a derived key to enable handshake with the supplicant 120. The mesh authenticator 115 then derives PTK to secure a link with the supplicant, and thereafter, association between the supplicant 120 and the mesh authenticator 115 using, for example, association frames in accordance with 802.11 standards, is performed. Lastly, routing setup 920 between the supplicant 120 and the mesh authenticator 115 is completed.

Figure 10:
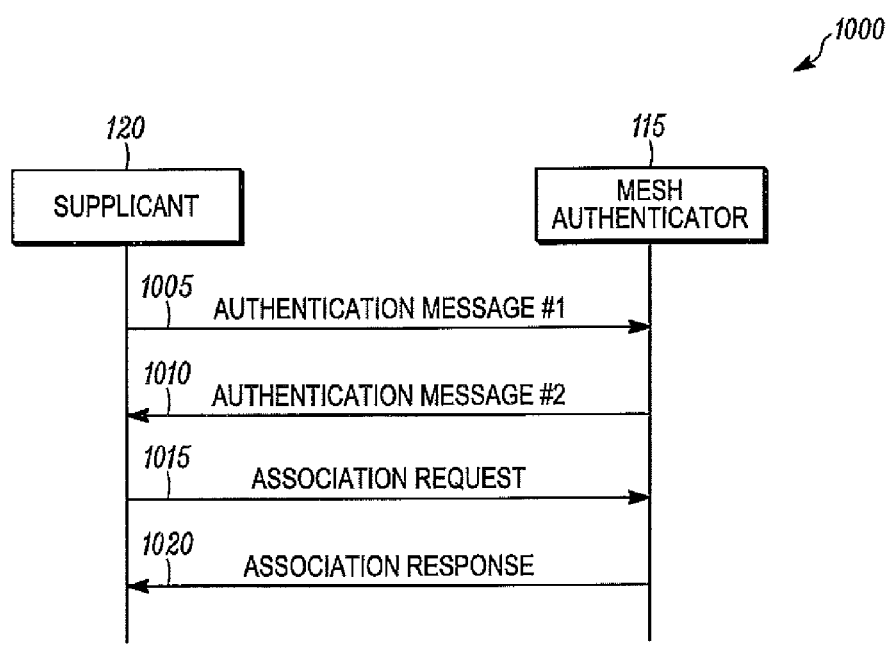
FIG. 10 illustrates a further detail of the messaging sequence chart of FIG. 9 in accordance with some embodiments of the present invention.

FIG. 10 illustrates a messaging diagram 1000 further detailing the communication for fast link establishment between the supplicant 120 and the mesh authenticator 115 in accordance with some embodiments of the present invention. As illustrated in FIG. 10, an authentication message #1 1005 is sent from the supplicant 120 to the mesh authenticator 115. The authentication message 11005 includes:

MSDIE: configured exactly as advertised by the MA in its beacons and probe responses.
    EMSAIE contains
        MA-ID is set to the MAC address of the mesh authenticator 115
        SNonce: is be set to a value chosen randomly by the supplicant 120
        All other fields set to zero.
    RSN IE:
        PMKID field contains PMK-MKDName obtained during supplicant's Initial EMSA Authentication.
        All other fields are set according to the configuration of the supplicant 120

After receiving the first message, the MA calculates PMK-MAName. If not in possession of the key identified by PMK-MAName, it may attempt to retrieve it from the MKD using a key transfer protocol.

The mesh authenticator 115 then sends an authentication message #2 1010 to the supplicant 120. The authentication message #2 1010 includes:

MSDIE: configured exactly as advertised by the MA in its beacons and probe responses
    EMSAIE: contains
        SNonce from the first authentication message 1005
        MA-ID: the MAC address of the MA
        ANonce: is set to a value chosen randomly by the MA.
        All other fields set to zero.
    RSN IE:
        PMKID field set as in the first authentication message 1005;
        All other fields as in RSNIE advertised by MA in beacons & probe responses After the authentication message #2 1010 is communicated, the supplicant 120 can compute PMK-MA and PMK-MAName. Further, both supplicant and MA will compute the PTK and PTKName.

Next, the supplicant 120 sends an association request 1015 to the mesh authenticator 115. The Association Request IE includes:

MSDIE: exactly as in the first authentication message 1005
    EMSAIE contains
        ANonce, SNonce, and MA-ID as in the second authentication message 1010
        GTK (encrypted using PTK) of supplicant MP
        The MIC algorithm subfield of the MIC control field set to indicate the cryptographic algorithm used to calculate the MIC
        The Information element count field of the MIC control field is set to 3, the number of information elements in this frame.
        The MIC is calculated using the PTK, by the algorithm selected by the MIC algorithm subfield, on the concatenation in the following order, of:
        SPA (Supplicant MAC Address)
        MA MAC address
        Transaction sequence number (1 octet), set to the value 3.
        Contents of the MSDIE
        Contents of the EMSAIE, with MIC field set to 0.
        Contents of the RSNIE
        All other fields set to zero.
    RSN IE: PMKID field contains PMK-MAName, and all other fields are set according to the configuration of the supplicant 120

The MA verifies the MIC in the EMSAIE, discarding the message if it is incorrect. The MA unwraps the GTK and installs for use in decrypting broadcast messages received from supplicant.

Lastly, the mesh authenticator 115 sends an association response 1020 to the supplicant 120. The Association Response IE includes:

MSDIE: exactly as in the second authentication message 1010
EMSAIE contains
   MA-ID, ANonce, and SNonce as in second authentication message 1010
   GTK (encrypted using PTK) of MA
   The MIC algorithm subfield of the MIC control field set to indicate the cryptographic algorithm used to calculate the MIC
   The Information element count field of the MIC control field shall be set to 3, the number of information elements in this frame.
   The MIC is calculated using the PTK, by the algorithm selected by the MIC algorithm subfield, on the concatenation in the following order, of:
   SPA (Supplicant MAC Address)
   MA MAC address
   Transaction sequence number (1 octet), set to the value 4.
   Contents of the MSDIE
   Contents of the EMSAIE, with MIC field set to 0.
   Contents of the RSNIE
   All other fields set to zero.
RSN IE: PMKID field contains PMK-MAName, and all other fields are configured as in RSNIE advertised by MA in beacons & probe responses The supplicant 120 verifies the MIC in the EMSAIE and discards the message if it is incorrect. The supplicant 120 unwraps the GTK and installs it for use in decrypting broadcast messages received from MA 115.

After successful completion of the procedure, the MPs are associated, and the PTK is used for protection of data traffic between the two MPs. The MA allows the supplicant to send traffic protected using the PTK via the 802.1X controlled port.

Figure 11:
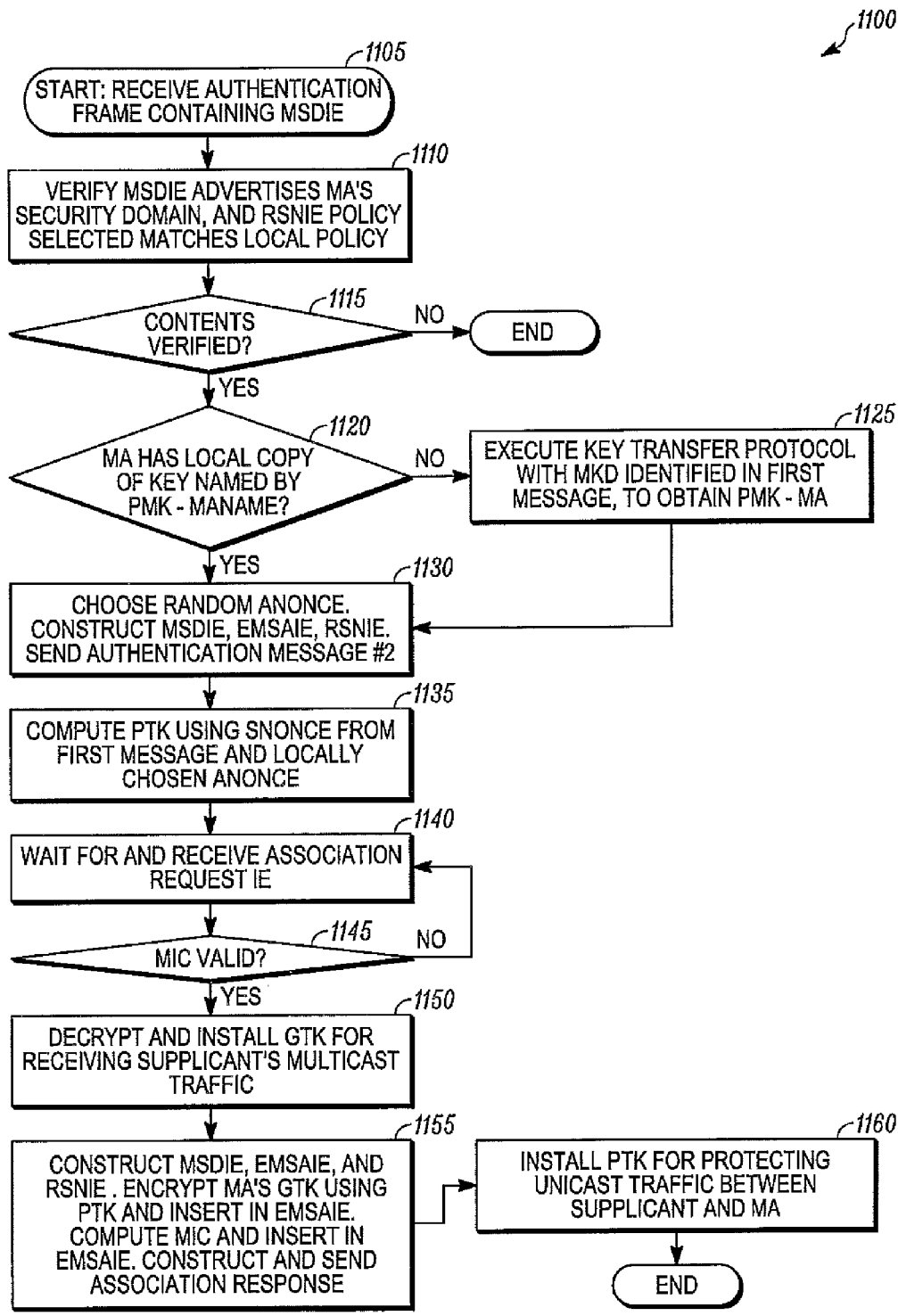
FIG. 11 is a flowchart illustrating an exemplary operation of a mesh authenticator within the network of FIG. 1 in accordance with some embodiments of the present invention.

FIG. 11 is a flowchart illustrating an exemplary operation 1100 of a mesh authenticator during fast link establishment in accordance with some embodiments of the present invention. As illustrated in FIG. 11, the operation begins in Step 1105 when the mesh authenticator receives an authentication message containing an MSDIE. Next, in Step 1110, the mesh authenticator verifies the MSDIE in the received authentication request advertises the MA's security domain, and that the RSNIE policy matches the local policy. Next, in Step 1115, it is determined whether or not the contents were verified. If the contents were not verified, the operation ends. If the contents were verified, the operation continues to Step 1120 in which the mesh authenticator determines if it has a local copy of a key named by the PMK-MAName. If it does not have a local copy, the operation proceeds to Step 1125 in which the mesh authenticator executes a key transfer protocol with the MKD identified in the first authentication message to receive the PMK-MA.

Next, and when the mesh authenticator has the local copy of the key, the operation proceeds to Step 1130 in which the mesh authenticator chooses a random ANonce, constructs MSDIE, EMSAIE, and RSNIE, and sends authentication message #2.

Next, in Step 1135, the mesh authenticator computes PTK using SNonce from the first received authentication message and the locally chosen ANonce. The mesh authenticator then, in Step 1140, waits for and receives the association request IE. Upon receipt, the operation continues to Step 1145 in which the mesh authenticator determines whether the MIC is valid. If the MIC is not valid, the operation cycles back to Step 1140. If the MIC is valid, the operation continues to Step 1150, in which the mesh authenticator decrypts and installs GTK for receiving the supplicant's multicast traffic.

Next, in Step 1155, the mesh authenticator constructs MSDIE, EMSAIE, and RSNIE, encrypts its GTK using PTK and inserts it in EMSAIE, computes a MIC and inserts it in EMSAIE, and constructs and sends an association response. Lastly, the mesh authenticator installs PTK for protecting unicast traffic between itself and the supplicant.

The present invention separates authentication into two steps: an initial first contact step (AAA-based authentication), and a "light-weight" step that reuses key material generated during first contact.

The present invention also splits the role of authenticator into two parts. The first role of the mesh authenticator is to implement an 802.1X port access entity (PAE), derive transient keys used for encryption with a supplicant mesh point via a 4-way handshake and take care of back end communications with a key distributor. The second role of the mesh authenticator is as a key distributor that implements a AAA-client and derives keys used to authenticate a mesh point during first contact or fast security association. The key distributor and the on-line AAA server can communicate to one another using Radius without these messages being transported over mesh links.

The present invention further solves key delivery challenges using layer 2 protocols. It tunnels EAP authentication messages from supplicant mesh points to a key distributor. It further takes the delivery of key material from the mesh key distributor. It performs these tasks in an efficient manner and employing protocols and frame types that may be specified at layer 2.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for establishing security associations with one or more nodes of an ad hoc wireless network and with a key distributor comprising:
   performing an initial authentication of a node, the initial authentication comprising:
      sending an association request from the node to an authenticator node,
      sending an association response from the authenticator node to the node, wherein the association response includes a key distributor address identifying the key distributor with which the authenticator node has a pre-existing security association,
      performing authentication between the node, the key distributor, and an authentication server to create a master session key,
      deriving a mesh key distributor pairwise master key (PMK-MKD) and a key distribution key (KDK) from the master session key at the key distributor and at the node;

deriving a mesh authenticator pairwise master key (PMK-MA) from the PMK-MKD at the key distributor and at the node, sending the PMK-MA from the key distributor to the authenticator node;

creating a security association between the node and the authenticator node by performing a four-way handshake between the authenticator node and the node, using the PMK-MA; and performing a key holder setup handshake between the node and the key distributor to create a key distribution pairwise transient key (PTK-KD) from the KDK based on the key distributor address and nonces contributed by the node and the key distributor;

broadcasting, by the authenticator node, information to the nodes of the ad hoc wireless network allowing the nodes to join the network, wherein the information broadcasted by the authenticator node comprises an identifier of a mesh security domain that contains the key distributor.

2. An ad hoc wireless network as claimed in claim 1, wherein the authenticator node is designed to:

authenticate with the authentication server to generate another master session key at the authentication server, derive mutually with the key distributor node, a first set of keys for key transport with the key distributor node to create the pre-existing security association between the authenticator node and the key distributor, and derive a second set of keys for communication with the nodes.

3. A method of operation of a mesh authenticator for establishing security associations of nodes of an ad hoc wireless network, the method comprising:

performing an initial authentication of a supplicant by a first mesh authenticator comprising:

enabling an authentication of the supplicant with a mesh key distributor and an authentication server to create a master session key that enables the supplicant and the mesh key distributor to mutually derive a mesh key distributor pairwise master key (PMK-MKD), obtaining a first mesh authenticator pairwise master key (PMK-MA) from the mesh key distributor on behalf of the supplicant, wherein the first PMK-MA is derived from the PMK-MKD, deriving a first pairwise transient key (PTK) by performing a four-way handshake with the supplicant using the first PMK-MA, and establishing a security association with the supplicant by installing the first pairwise transient key; and performing a fast link establishment of the supplicant by a second mesh authenticator comprising:

receiving an authentication message containing an SNonce and an identifier (PMK-MKDName) of the PMK-MKD from the supplicant, calculating an identifier (PMK-MAName) of a second PMK-MA using the PMK-MKDName;

deriving a second PTK from the second PMK-MA using the SNonce from the received authentication message and a locally chosen ANonce, and establishing a security association with the supplicant by installing the second PTK for protecting unicast traffic between the second mesh authenticator and the supplicant wherein the four-way handshake comprises:

constructing and transmitting to the supplicant a 4-way handshake #1 message including a ANonce received from the mesh key distributor, computing PTK using a SNonce in a received 4-way handshake #2 message, decrypting and installing a group temporal key (GTK) for receiving supplicant's multicast traffic, constructing and sending to the supplicant a 4-way handshake message #3 comprising the MSDIE, EMSAIE, RSNIE, MIC and key data encapsulation (KDE) containing the MA's GTK, all encrypted using the PTK, and receiving a 4-way handshake #4 message.

* * * * *